Aug. 28, 1956 H. F. FLOWERS 2,760,657
DUMPING MECHANISM FOR TILTABLE CAR BODIES
Filed Aug. 3, 1954 4 Sheets-Sheet 3

INVENTOR.
Henry Fort Flowers,
BY
Mason, Porter, Diller & Stewart
ATTYS.

Aug. 28, 1956 H. F. FLOWERS 2,760,657
DUMPING MECHANISM FOR TILTABLE CAR BODIES
Filed Aug. 3, 1954 4 Sheets-Sheet 4
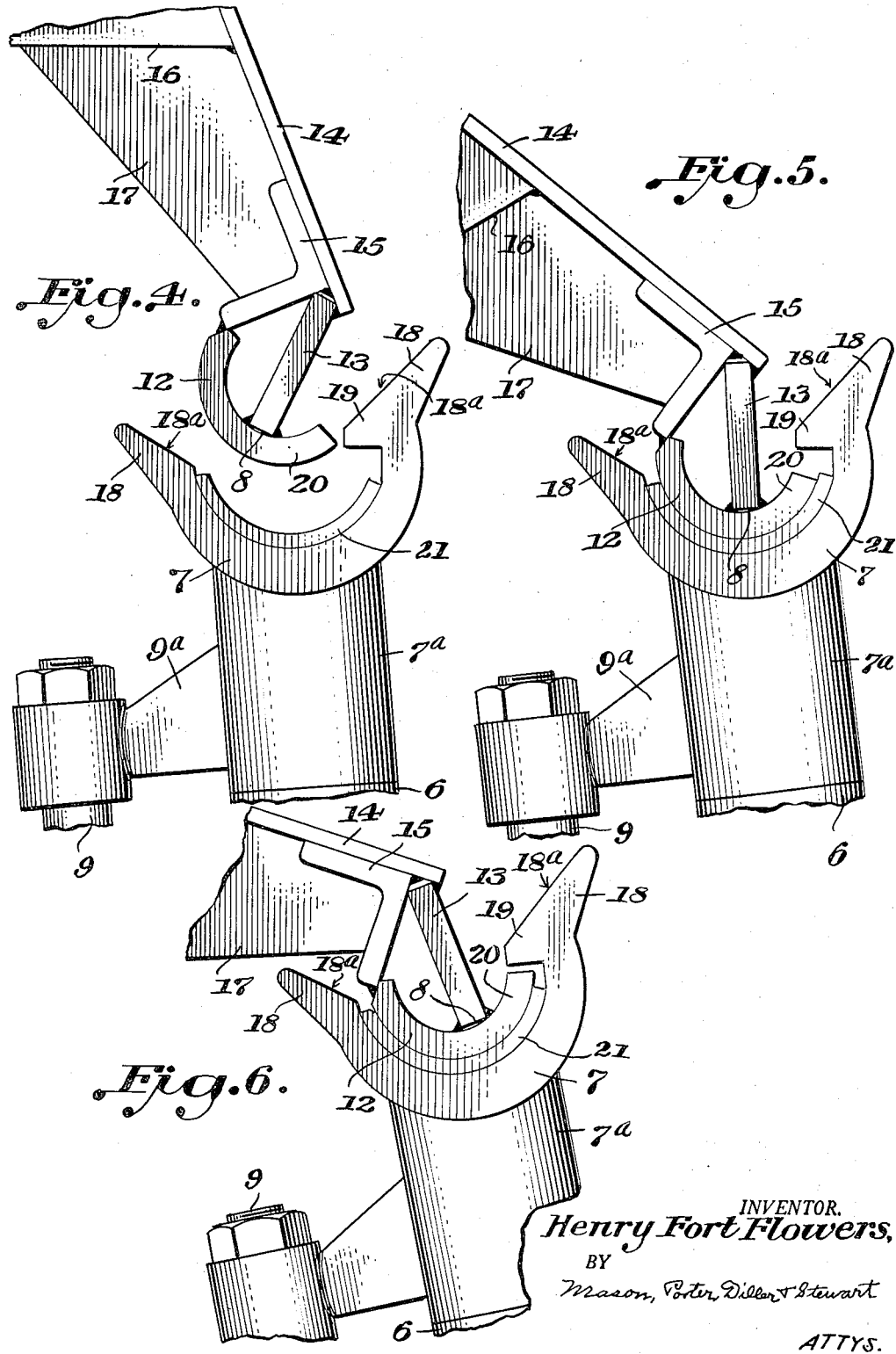
INVENTOR.
Henry Fort Flowers,
BY Mason, Porter, Diller & Stewart
ATTYS.

United States Patent Office 2,760,657
Patented Aug. 28, 1956

2,760,657

DUMPING MECHANISM FOR TILTABLE CAR BODIES

Henry Fort Flowers, Findlay, Ohio

Application August 3, 1954, Serial No. 447,609

3 Claims. (Cl. 214—64)

This invention relates to a car dumping device of the type wherein the dumping device is located at one side of the track at a dumping station and the car is positioned within range of the dumping device for tilting to discharge its load.

An object of the invention is to provide a dumping device which is so constructed as to automatically engage a contact bar on the car body and become locked thereto as the body tilts thus preventing the car from overturning when tilted to a maximum angle for dumping the contents thereof.

A further object of the invention is to provide a dumping device of the above type in which the body attachments are fabricated from tubing and bars by simple welding procedures.

These and other objects will in part be obvious and will in part be hereinafter more fully disclosed.

In the drawings, which show by way of illustration the preferred embodiment of the invention:

Figure 4 is an enlarged side elevation of the head portion of the dumping device and the contact bar on the body and the means for attaching said contact bar to the body, the parts being in the position where the dumping device is disconnected from the contact bar.

Figure 5 is a view showing the body as tilted to about 30 degrees and the contact bar firmly seated in the recess of the head of the dumping device, said contact bar having been shifted laterally in the recess by the tilting of the body.

Figure 6 is a view similar to Figure 5 but showing the body as tilted to approximately 50 degrees and also showing the contact bar as shifted to a position beneath the inwardly projecting flange so that said bar and head are locked in engagement.

Figure 1:
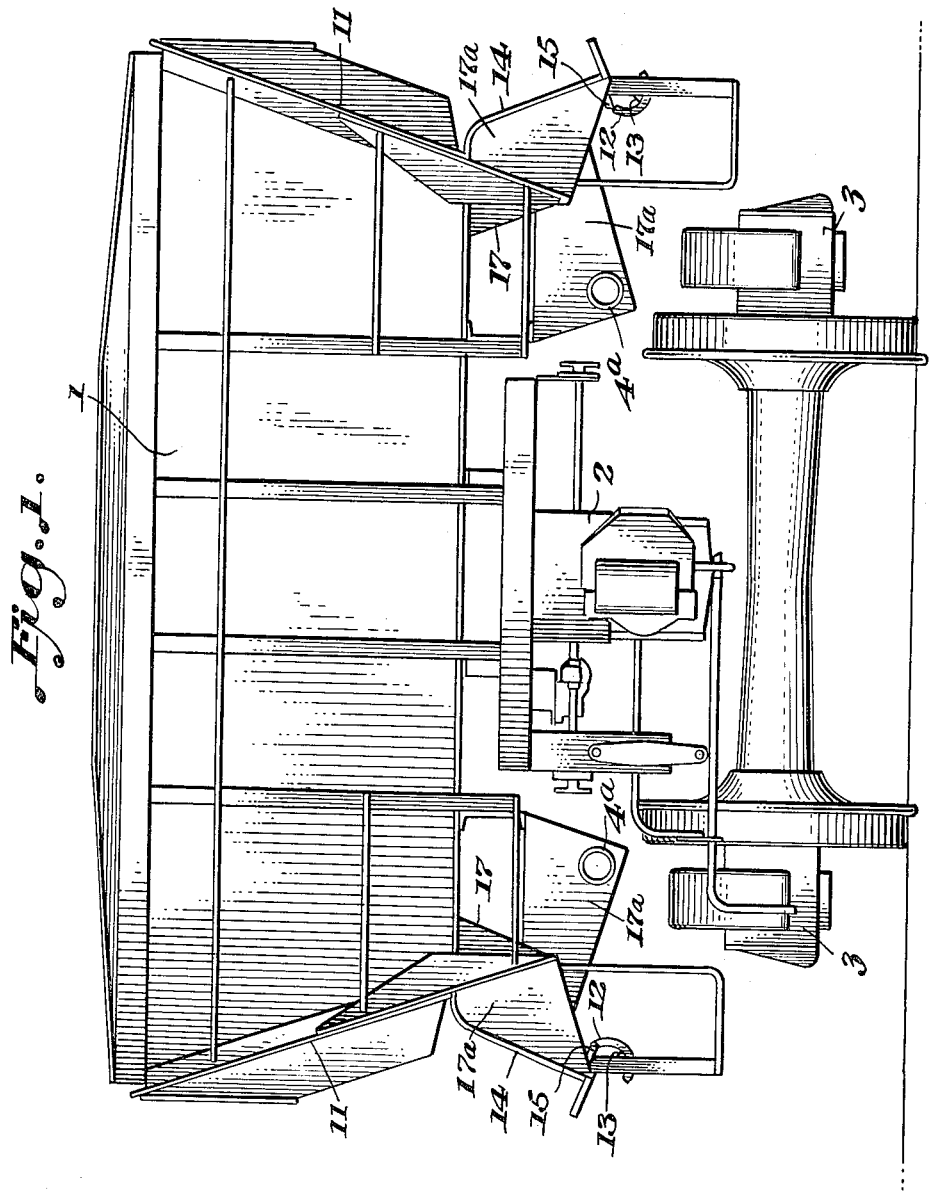
Figure 1 is a view in end elevation showing some of the essential parts of a tiltable dumping car.

The invention has to do with a car dumping mechanism of the type where the power mechanism for tilting the car body is mounted at one side of the track at a dumping station, and the car is moved on the track to a position within the range of the power mechanism. The car is of the usual type wherein the body is mounted on trunnions so that it may be tilted for dumping its contents. The door at the dumping side automatically opens as the body is tilted. The only novel feature in the car is the arrangement and construction of the contact bar attached to the side of the car and with which the power mechanism makes engagement for tilting the body.

The power mechanism is generally of a well known type. It includes a cylinder mounted on a supporting base for lateral oscillation toward and from the track. Associated with the cylinder is a piston and piston rod at the outer end of which is a head that engages the contact bar on the body for tilting the body for dumping the contents thereof. The novelty in the dumping device is in the head which engages the contact bar of the car for tilting the same.

The car as shown in the drawings includes a body 1 having down folding members 11 which open automatically at the dumping side when the body is tilted. The body also includes floor beams 16 extending from one side of the car to the other. Secured to the floor beams and depending therefrom are plates 17ª carrying trunnions 4ª. These trunnions engage an upwardly facing seat on the bolsters carried by the center beam 2. The center beam is mounted on trucks indicated at 3.

Figure 2:
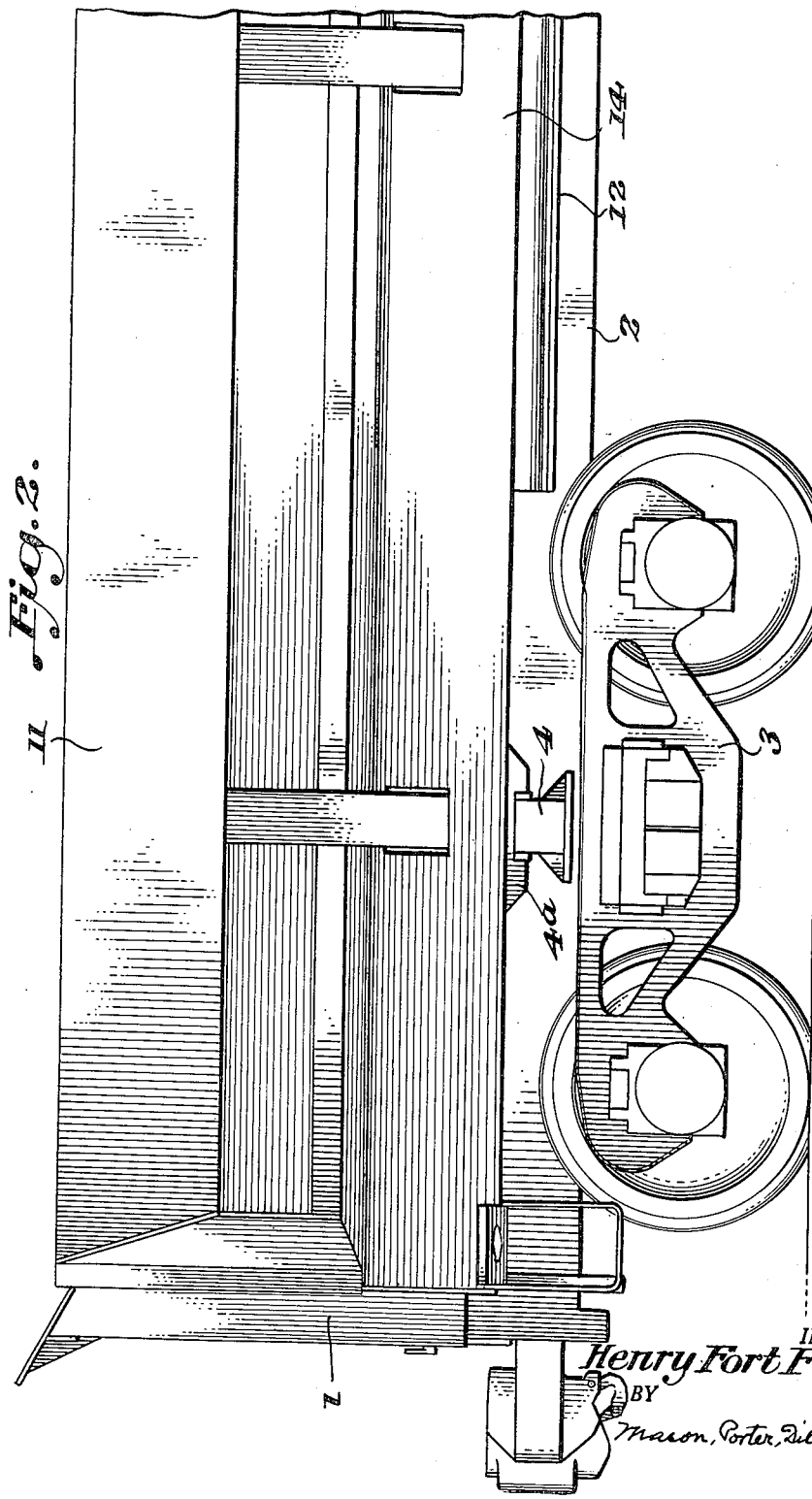
Figure 2 is a side view of a portion of the body.
Figure 3:
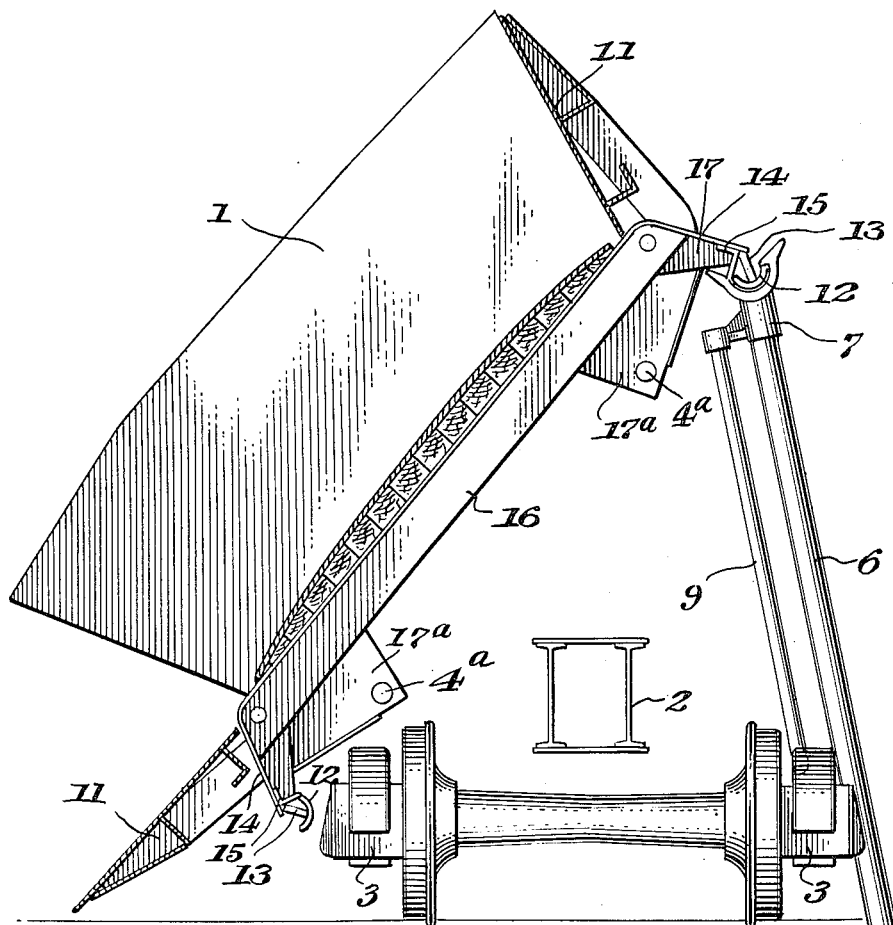
Figure 3 is a view showing the body engaged by the dumping device and tilted for dumping the contents thereof.

The body has depending gussets 17, 17 welded to the floor beams and welded to these gussets are downwardly extending skirts 14, 14 which are extensions of the floor plate. Welded to the lower end of the skirt 14 is a depending supporting plate 13. Also welded to the underface of the skirt 14 is an angle bar 15. One leg of the angle bar depends from the skirt. A contact bar 12 is welded to the supporting plate 8 and to the angle bar 15. This contact bar as shown in Figure 2 extends for some distance along the body of the car for reasons which will be referred to later. The contact is curved transversely.

The power lifting mechanism for tilting the body for dumping referred to as the dumping device includes a cylinder 5 which is pivotally mounted on a supporting base so that it may oscillate toward and from the track as the body is raised and lowered thereby. Mounted in the cylinder is a piston to which a piston rod 6 is connected. This piston rod 6 carries at its outer end a coupling head 7. Said head 7 is carried by a cylindrical portion 7ª which is attached to the upper end of the piston rod. The head 7 is formed from a plate which is curved to provide a recess, the bottom of which conforms in curvature to the curve of the outer face 20 of the supporting bar 12. Disposed in the recess is a hardened wear plate 21, the upper surface of which is also curved to conform with the curvature of the outer face of the contact bar 12. The curved head 7 is provided with laterally projecting flanges 18, 18 at both ends thereof. These flanges have tapered surfaces 18ª which guide the head onto the bar so that it will enter the recess and engage the wear plate 21 as shown in Figures 5 and 6. The curved head at the right thereof has an inwardly projecting portion 19 which overhangs the recess. The inner end of this projecting portion 19 terminates so as to provide sufficient room for the contact bar 12 on the car body to enter the head 7 and contact the wear plate 21. In Figure 4 the car mechanism or dumping device is being raised so as to engage the contact bar on a car and it will be noted that the contact bar can readily pass the projection into the recess and into contact with the wear plate as shown in Figure 5.

Fluid pressure directed to the cylinder 5 in the usual manner will lift the piston rod to bring the head into engagement with the contact bar on the car and further movement will tilt the body and as the body tilts the contact bar 12 will move across or along the wear plate 21 to a position beneath the projecting portion 19 and to a point adjacent the inner face of said projection as shown in Figure 6. Figure 5 shows the position of the contact bar 12 in the recess or pocket of the dumping device when the car is being tilted to approximately a thirty degree angle, and Figure 6 shows the position of the contact bar in the recess or pocket of the dumping head when the body has been tilted to an angle of approximately fifty degrees which is full dumping position. It is noted that this projection 19 on the dumping head serves as a means for locking bar 12 to the head so that any tendency of the car body to overturn when tilted to the extreme angle for dumping is resisted. When the body is returned to transport position after having dumped the contents thereof the dumping device is retracted and this will cause the contact bar to shift from the position shown in Figure 6 to a position shown in Figure 4 so that it can readily move past the projection 19 and be disconnected from the dumping device.

Attached to the cylindrical portion 7ª of the dumping head is a bracket 9ª carrying a guide rod 9 which moves through an opening in an arm 10 attached to the upper end of the cylinder 5. The purpose of this guide rod is to insure that the head 7 will be maintained in proper alinement with the bar so as to permit the same to enter the recess in the head. At the time when the parts are positioned as shown in Figure 4 the guide rod 9 is in the opening in the arm 10.

In practice there are two contact bars at each side of the car body and at the dumping station there are two power mechanisms or dumping devices which are operated in synchronism for engagement with the contact bars for tilting the body. These contact bars extend for some little distance along the side of the car so that when the car is moved along the track to position the same relative to the dumping devices there is considerable range within which the dumping devices may contact the bar.

It is obvious that many changes in the details of construction may be made without departing from the spirit of the invention as set forth in the appended claims.

I claim:

1. The combination of a tiltable car body having along one side thereof an elongated contact bar the underface of which is semi-circular, and a body tilting device independent of the car and terminating in a coupling head provided with an upwardly facing recess the bottom of which is curved to conform to the curvature of the contact bar on the car, said coupling head having at each side of the recess an upwardly projecting flange, the inner faces of which are inclined upwardly and outwardly away from the recess for guiding said contact bar into the recess, the flange at the outer side of the head having a projection extending inwardly and overhanging said recess, said body tilting device being so disposed relative to the car that, when the body is tilted for dumping, said bar will move laterally of the recess and beneath the projection whereby the head is locked to the contacting bar on the body.

2. The combination of a tiltable car body having along one side thereof an elongated contact bar the underface of which is semi-circular, and a body tilting device independent of the car and terminating in a coupling head provided with an upwardly facing recess, a wear plate fitting in said recess and having its upper face curved to conform to the curvature of the contact bar on the car, said coupling head having at each side of the recess an upwardly projecting flange, the inner faces of which are inclined upwardly and outwardly away from the recess for guiding said contact bar into the recess, the flange at the outer side of the head having a projection extending inwardly and overhanging said recess, said body tilting device being so disposed relative to the car that, when the body is tilted for dumping, said bar will move laterally on said wear plate and beneath the projection whereby the head is locked to the contacting bar on the body.

3. The combination of a tiltable car body having at one side thereof a depending supporting plate and an angle bar which is secured to the body and depending therefrom and a curved contact bar welded to the ends of the plate and angle bar, the underface of said contact bar being semi-circular, and a body tilting device independent of the bar and terminating in a coupling head provided with an upwardly facing recess the bottom of which is curved to conform to the curvature of the contact bar on the car, said coupling head having at each side of the recess an upwardly projecting flange, the inner faces of which are inclined upwardly and outwardly away from the recess for guiding said contact bar into the recess, the flange at the outer side of the head having a projection extending inwardly and overhanging said recess, said body tilting device being so disposed relative to the car that, when the body is tilted for dumping, said bar will move laterally of the recess and beneath the projection whereby the head is locked to the contacting bar on the body.

References Cited in the file of this patent

UNITED STATES PATENTS

| 883,032 | Link | Mar. 24, 1908 |
| 1,624,323 | Flowers | Apr. 12, 1927 |
| 1,959,976 | Anderson et al. | May 22, 1934 |
| 2,663,438 | McCune | Dec. 22, 1953 |